United States Patent
Liu et al.

(10) Patent No.: US 12,314,741 B2
(45) Date of Patent: May 27, 2025

(54) DYNAMIC AND INTELLIGENT VIRTUAL DESKTOP MANAGEMENT

(71) Applicant: Omnissa, LLC, Mountain View, CA (US)

(72) Inventors: Bo Liu, Beijing (CN); Yingfeng Ou, Beijing (CN); Feng Yan, Beijing (CN); Per Olov Larsson, London (GB); Lin Lv, Beijing (CN); Dongyu Zhao, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 308 days.

(21) Appl. No.: 17/943,196

(22) Filed: Sep. 13, 2022

(65) Prior Publication Data

US 2024/0028355 A1 Jan. 25, 2024

(30) Foreign Application Priority Data

Jul. 19, 2022 (WO) ................ PCT/CN2022/106461

(51) Int. Cl.
*G06F 9/451* (2018.01)
*G06F 9/445* (2018.01)
*H04L 9/40* (2022.01)

(52) U.S. Cl.
CPC .......... *G06F 9/452* (2018.02); *G06F 9/44505* (2013.01); *H04L 63/10* (2013.01)

(58) Field of Classification Search
CPC ....... G06F 9/452; G06F 9/44505; H04L 63/10
See application file for complete search history.

(56) References Cited

U.S. PATENT DOCUMENTS

| | | | | |
|---|---|---|---|---|
| 9,086,897 | B2* | 7/2015 | Oh | G06F 9/452 |
| 9,342,326 | B2* | 5/2016 | Ramarathinam | G06F 9/44505 |
| 10,089,130 | B2* | 10/2018 | Kim | G06F 9/45558 |
| 11,005,721 | B1* | 5/2021 | Patki | H04L 43/065 |
| 2013/0007737 | A1* | 1/2013 | Oh | G06F 9/452 718/1 |
| 2013/0332610 | A1* | 12/2013 | Beveridge | G06F 9/45558 709/226 |

(Continued)

OTHER PUBLICATIONS

"Anywhere Workspace Solutions"; https://www.vmware.com/solutions/anywhere-workspace.html; Retrieved on Sep. 12, 2022.

(Continued)

*Primary Examiner* — J. Brant Murphy
(74) *Attorney, Agent, or Firm* — Kim & Stewart LLP

(57) ABSTRACT

Systems and methods are provided for dynamically optimizing and configuring various aspects of virtual desktops in virtual desktop infrastructure. Data collectors can be installed on and operate on various components in the virtual desktop infrastructure, such as on the virtual desktops running on the server, on the virtual desktop clients running on user devices, and on the connection server. The data collectors can operate to collect various types of information from corresponding components, such as application usage data and status, device performance, networking environment and speed, application or system crash data, and so on. The collected data can be logged, tracked, and analyzed to perform various actions on the virtual desktop.

20 Claims, 4 Drawing Sheets

(56) References Cited

U.S. PATENT DOCUMENTS

| | | | | |
|---|---|---|---|---|
| 2013/0339950 | A1* | 12/2013 | Ramarathinam | G06F 9/5077 718/1 |
| 2015/0113528 | A1* | 4/2015 | Kim | G06F 9/452 718/1 |
| 2016/0182284 | A1* | 6/2016 | Ayanam | G06F 9/45558 709/222 |
| 2016/0342441 | A1* | 11/2016 | Beveridge | G06F 9/452 |
| 2017/0111291 | A1* | 4/2017 | Battersby | H04L 67/10 |
| 2019/0068478 | A1* | 2/2019 | Salinas | G06F 11/3068 |
| 2022/0058042 | A1* | 2/2022 | Vanjare | H04L 41/40 |
| 2022/0350628 | A1* | 11/2022 | Parry-Barwick | G06F 9/44505 |
| 2023/0222041 | A1* | 7/2023 | Muniraju | G06F 11/2033 714/10 |

OTHER PUBLICATIONS

"Managing Access to Windows Media Multimedia Redirection (MMR)"; https://docs.vmware.com/en/VMware-Horizon-7/7.13/horizon-remote-desktop-features/GUID-C512C68A-8C75-47F7-8AD6-F4CC89BC7DA2.html; Updated on May 31, 2019; retrieved on Sep. 12, 2022.

E.B. Bellers, G. De Haan; "Advanced Motion Estimation and Motion Compensated De-interlacing"; SMPTE Motion Imaging Journal; Jan. 1996; vol. 106; DOI:10.5594/J17643.

Tianfan Xue, Baian Chen, Jiajun Wu, Donglai Wei, William T. Freeman; "Video Enhancement with Task-Oriented Flow"; International Journal of Computer Vision (IJCV), 127(8): 1106-1125, 2019; arXiv:1711.09078v3.

Wenbo Bao, Wei-Sheng Lai, Chao Ma, Xiaoyun Zhang, Zhiyong Gao, Ming-Hsuan Yang; "Depth-Aware Video Frame Interpolation"; Computer Vision and Pattern Recognition; arXiv: 1904.00830v1.

"ThousandEyes"; https://www.thousandeyes.com/; retrieved on Sep. 12, 2022.

"Nexthink"; https://www.nexthink.com/; retrieved on Sep. 12, 2022.
"Controlup"; https://www.controlup.com/; retrieved on Sep. 12, 2022.

* cited by examiner

DYNAMIC AND INTELLIGENT VIRTUAL DESKTOP MANAGEMENT

CLAIM OF PRIORITY

This application is based upon and claims the benefit of priority from International Patent Application No. PCT/CN2022/106461, filed on Jul. 19, 2022, which is incorporated by reference herein in its entirety.

TECHNICAL FIELD

The present disclosure generally relates to virtual desktop infrastructure and more specifically to techniques for managing virtual desktops based on analysis of data collected throughout the infrastructure.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as Remote Desktop Protocol (RDP), PC-over-IP protocol (PCoIP), virtual network computing (VNC) protocol, or the like. Using the remote display protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

However, as more and more users in enterprises turn to virtual desktops for their computing needs, management of the desktops is becoming increasingly challenging for organizations. In a typical enterprise today, large numbers of virtual desktops may be used by different types of users in diverse, dynamic scenarios and previous technology was inadequate at efficiently managing such vast deployments of desktops in the highly varied and quickly changing environments where they may be deployed.

For example, a user may access their virtual desktop to perform some tasks in the office on an office machine over a secure network, then leave the office and access the virtual desktop on a mobile device over a poor connection, and then access the virtual desktop on yet another device for performing different tasks over a public network. In such dynamic scenarios, various aspects of the virtual desktop generally need to be reconfigured or adjusted to provide optimal performance and address numerous organizational concerns such as security, user experience, etc. However, with previous technology, even where certain aspects of virtual desktops may have been configurable by administrators or users to better suit changing environments, carrying out changes to configurations on desktops manually was impractical in the real-world setting. As a result, most enterprises are facing issues such as fragmented cyber security, performance degradation, operational complexity, and subpar user experiences in virtual desktop deployments.

What is needed is a more efficient way for dynamic and intelligent management of virtual desktops.

DETAILED DESCRIPTION

Figure 1:
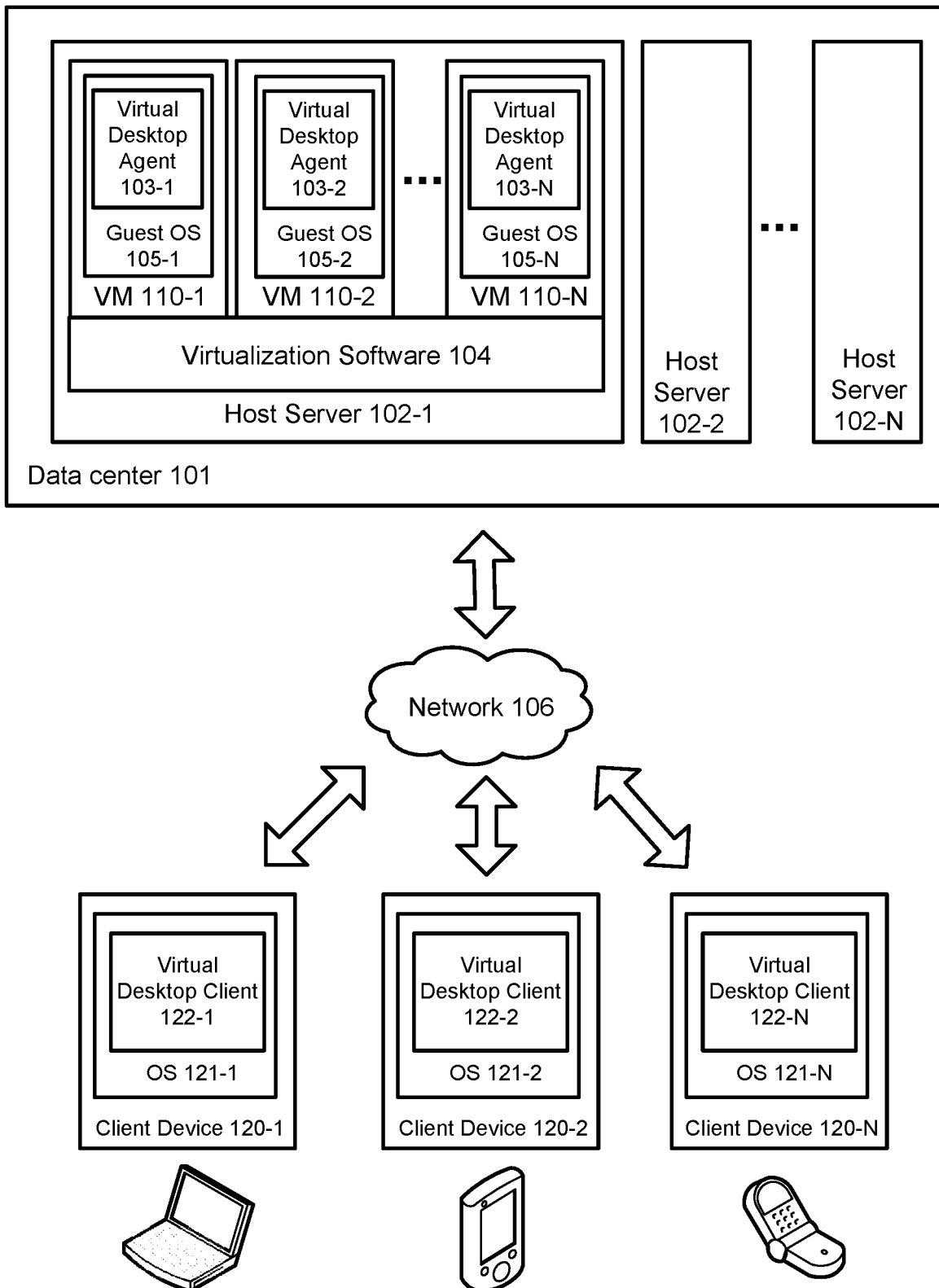
FIG. 1 illustrates an example of a virtual desktop environment, in accordance with various embodiments.

Systems and methods in accordance with various embodiments of the present disclosure overcome at least some of the above-mentioned shortcomings and deficiencies by providing more efficient ways for dynamic and intelligent virtual desktop management. In particular, embodiments described herein leverage mechanisms for collecting data from different components in the virtual desktop environment for dynamically optimizing and configuring various aspects of managed virtual desktops.

In the system, data collectors can be installed on and operate on various components in the virtual desktop infrastructure, such as on the virtual desktops running on the server, on the user client devices, and on the connection server. The data collectors can operate to collect various types of information from corresponding components, such as application usage data and status, devices performance, networking environment and speed, application or system crash data, and so on. The collected data can be logged, tracked, and analyzed to perform various actions on the virtual desktop.

In various embodiments, the actions can include enabling or disabling certain features in a virtual desktop or adjusting and configuring features. For example, based on security assessments, features such as anti-keylogger and screen capture can be enabled or disabled on the client, or login to the desktop can be restricted in some cases. Various features can be enabled, disabled, or adjusted based on network conditions and available processing capacity, such as multimedia redirection (MMR), client drive redirection (CDR), clipboard redirection, frame interpolation, and others. Collected data can further be used to optimize user experience, such as by organizing applications on the virtual desktop based on usage, and by informing the user or restricting access to the virtual desktop when processing capacity on the client device is insufficient for providing good user experience.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote display protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
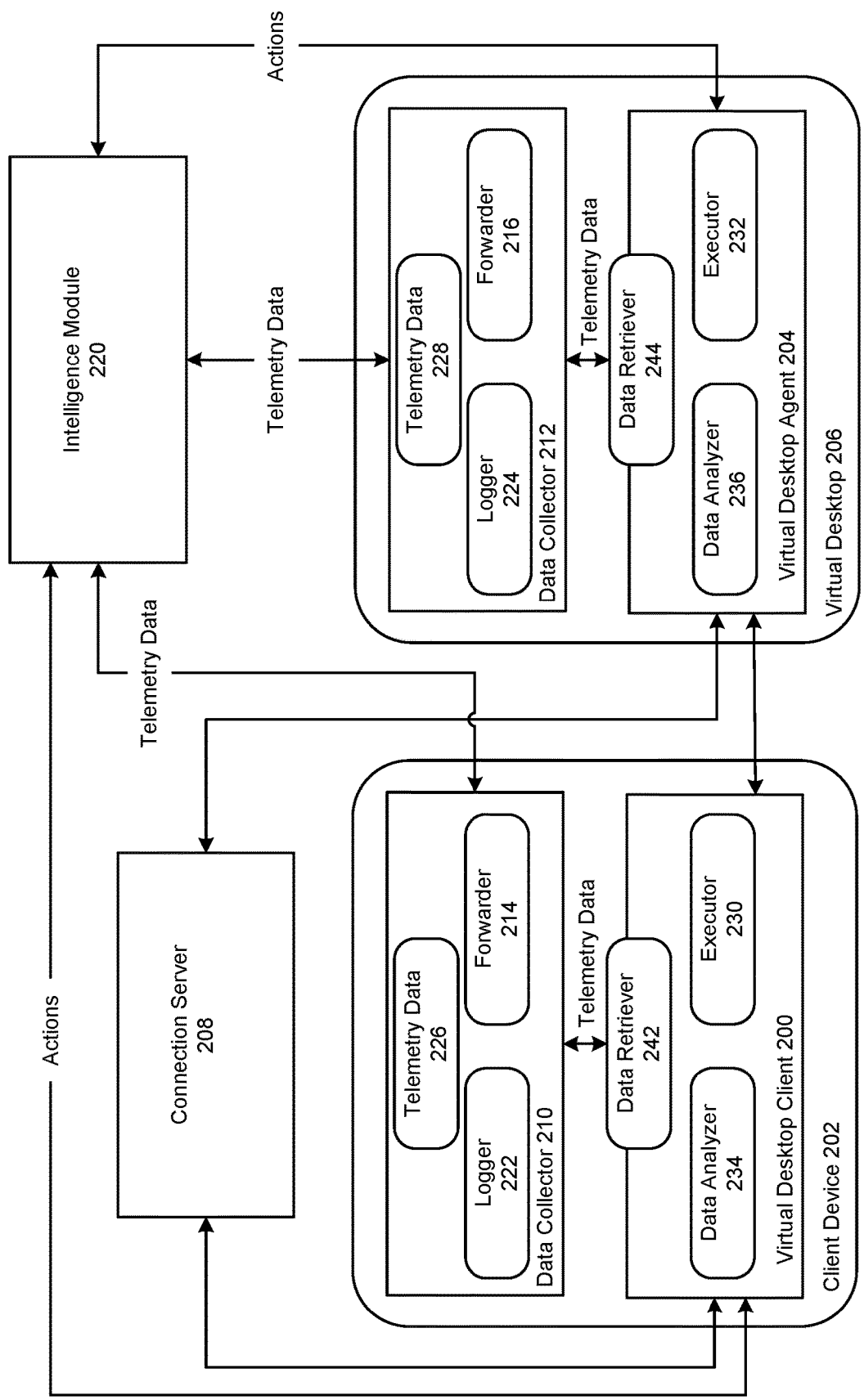
FIG. 2 illustrates an example architecture of a system for dynamic and intelligent management of virtual desktops, in accordance with various embodiments.

FIG. 2 illustrates an example architecture of a system for dynamic and intelligent management of virtual desktops, in accordance with various embodiments. As illustrated in the example of FIG. 2, a virtual desktop client 200 can operate on a client device 202. The client 200 can connect to a virtual desktop agent 204 running in a virtual machine 206, which may be hosted on a server, allowing a user of the client device 202 to access the virtual desktop. The connection may be established and brokered by a connection server 208. For example, the connection server 208 can verify user credentials before permitting the user of the client 200 to connect to the virtual desktop 206, and the connection server 208 can establish the corresponding channels and route data (e.g., inputs, outputs, GUI data, etc.) between the virtual desktop client 200 and the agent 204.

In various embodiments, a data collector 210 can run on the client device 202 and a data collector 212 can run on the virtual desktop 206. The data collectors 210, 212 can collect different types of data ("telemetry data") in the client device 202 and the virtual desktop 206, respectively, such as device data, application data, troubleshooting data, performance data, security data, etc. For example, data collected by the data collectors 210, 212 can be application usage data and status, device performance, networking environment and speed, application or system crash data, etc.

Application data may be collected by the data collectors 210, 212, including any information identifying the applications installed on the client device 202/desktop 206, how they are used (e.g., when they are opened or closed, when they are active or inactive, frequency of use, duration of use, time of use, etc.), when they are installed or updated, when they crash, and so on. For example, the data can include information such as what application are installed (e.g., on the client device 202 or on the virtual desktop 206), when applications are launched or closed, how long each application runs (e.g., per day, per week, in total, etc.), the activity status of the application (e.g., when it is in the active window), etc.

Device data may be collected by the data collectors 210, 212, including various information about the device itself, such as device configuration, hardware of the device (whether it is physical hardware on the client device 202 or virtual hardware on the desktop 206), the device network connections and network interfaces, etc. For example, device data can include information such as the device network connections and interfaces (e.g., device LAN, Wi-Fi, data connection, etc.), device manufacturer as well as manufacturers of various components on the device, BIOS information (version, etc.), memory (RAM and permanent storage) on the device, CPU and GPU configurations, etc.

Network connection parameters may be collected by the data collectors 210, 212 corresponding to the network connections of the client 202 and virtual desktop 206, which can include information such as information identifying the specific network, the network type (LAN, WAN, Wi-Fi, etc.), whether the network is public or private or password protected, etc. Network connection parameters can include various network performance parameters, such as network bandwidth, throughput, capacity, speed, and so on.

Performance data may be collected by the data collectors 210, 212, including various information about resource usage and performance of the client device 202 and the desktop 206. For example, performance data can include CPU and/or GPU use data of the device 202 or desktop 206, or the CPU and/or GPU use for each application on the client device 202 or the desktop 206.

Computing resource parameters may be collected by the data collectors 210, 212 corresponding to the computing resources of the client 202 and virtual desktop 206. Computing resource parameters can include resource configuration information, such as the configuration of various resources available on the client device 202 and the virtual desktop 206 (e.g., available CPU, GPU, RAM, disc space, etc.). Computing resource parameters can include real-time computing resource usage information, such as the real-time usage of CPU, GPU, RAM, disc space, etc.

Various real-time data may also be collected by the data collectors 210, 212, including information about activities performed on the client device 202 and the virtual desktop 206. For example, real-time data can include information about when an application is opened or closed, when an application hangs, when the user logs on or logs out of the client device 202 or desktop 206, etc.

Operating System (OS) related data can be collected by the data collectors 210, 212, including various information about the operating system on the client device 202 and the OS on the desktop 206 (e.g., the guest OS). For example, OS data can include information such as how many OS patches are installed, how many services are running in the OS (service list), when a service is started, when a service is stopped, etc.

Different approaches can be used to collect the telemetry data such as the data described above on the client device 202 and the virtual desktop 206. In various embodiments, application data may be gathered from the OS. For example, in the Microsoft® Windows operating system, application events can come from Microsoft® Windows ETW (Event Tracing Event).

Performance data can also be gathered from the OS. For example, Microsoft® Windows has performance counters that can provide resource usage data (e.g., CPU usage). As will be appreciated by those skilled in the art, different approaches can be used to gather the different types of data described above and elsewhere in this application on the client device 202 and on the desktop 206, and the invention is not limited to any particular approach for collecting the data.

Although not pictured, in various embodiments a data collector can also be installed and run on the connection server 208 for collecting at least some of the types of data (telemetry data) mentioned above (e.g., CPU and other resource usage, etc.), although the types of data collected may be different since some types of data may not be as relevant with respect to the connection server 208.

In various embodiments, the data collectors 210, 212 can each contain a corresponding logger module 222, 224 that can collect, track, and log the telemetry data (e.g., cache the data) on the client device 202 and desktop 206, respectively. The data collectors 210, 212 can then package the data (as and if necessary) to create a corresponding telemetry data package 226, 228 (e.g., format, organize the data, etc.), and the telemetry data 226, 228 can then be conveyed by a corresponding forwarder 214, 216 in each data collector 210, 212 to different decision-making modules in the system that can analyze the data and request certain actions, as will be described in more detail below. The telemetry data can be conveyed periodically, on a schedule, or when requested.

In various embodiments, the data collectors 210, 212 (as well as a data collector on the connection server 208) can send telemetry data to an intelligence module 220 (e.g., periodically, on a schedule, or when requested), which can be located on a server (e.g., a management server). The data can be sent by https request, for example. The intelligence module 220 can receive the telemetry data and based on the data, the telemetry module 220 can determine certain actions to be taken by the virtual desktop client 200 and/or the virtual desktop agent 204. For example, the intelligence module 220 can contain certain policy, such as logic, rules, etc., (which may be defined by administrators) for making decisions, and the intelligence module 220 can determine the actions based on such policy. The intelligence module 220 can then convey the instructions to perform/trigger the actions to the virtual desktop client 200 and/or agent 204. The virtual desktop client 200 and/or agent 204 can receive the instructions to perform the actions and a corresponding executor module 230, 232 in the virtual desktop client 200 and/or agent 204 can carry out the action by changing configurations, changing policies/rules, enabling/disabling features, making adjustments, etc. on the client 200 and agent 204, respectively. Similarly, the intelligence module 220 can send an action instruction to the connection server 208, to be implemented on the connection server 208

In various embodiments, the client 200 and agent 204 can further contain corresponding decision-making modules, such as data analyzer modules 234, 236, which can also be configured to determine certain actions to be taken by the virtual desktop client 200 and/or the virtual desktop agent 204 based on telemetry data. Data retriever modules 242, 244 in the virtual desktop client 200 and agent 204 can retrieve telemetry data from the data collectors 210, 212. For example, the data retriever modules 242, 244 can register different types of telemetry data that is of interest and the data collectors 210, 212 can forward the subscribed data. The received telemetry data can be cached by the client 200 and agent 204, and the corresponding decision makers (data analyzers 234, 236) can do analysis on the telemetry data (e.g., based on a pre-defined policy) to determine actions to be taken by the virtual desktop client 200 and/or the virtual desktop agent 204. For example, the client data analyzer 234 and the agent data analyzer 236 can each contain certain policy, such as logic, rules, etc., (which may be defined by administrators) for making decisions. The policies in the two data analyzers can be the same or different from each other, and they can be different from the policy used by the intelligence module 208 as well. The data analyzers 234, 236 can determine the actions based on such policies.

The data analyzers 234, 236 can convey the instructions to trigger/perform the actions to the executors 230, 232 in the virtual desktop client 200 and/or agent 204. The corresponding executor module 230, 232 in the virtual desktop client 200 and/or agent 204 can carry out the action by changing configurations, changing policies/rules, enabling/disabling features, making adjustments, etc. on the client 200 and agent 204, respectively.

In various embodiments, telemetry data can be shared by a component with any other components (e.g., with any decision-making modules) in the system (e.g., via virtual channels or over networks). For example, telemetry data collected on the client device 202 by the data collector 210 can be shared with the virtual desktop client 200, with the virtual desktop agent 204, and with the intelligence module 220. Telemetry data collected on the virtual desktop 206 by the data collector 212 can also be shared with the virtual desktop client 200, with the virtual desktop agent 204, and with the intelligence module 220. Telemetry data collected on the connection server 208 can likewise be shared with the virtual desktop client 200, with the virtual desktop agent 204, and with the intelligence module 220.

In various embodiments, any of the virtual desktop client 200, the virtual desktop agent 204, and the intelligence module 220 can analyze telemetry data received from any of the telemetry data sources and determine, based on policy, actions to be triggered on different components (e.g., actions to be taken by the virtual desktop client 200, by the agent 204, or by the connection server 208). For example, the virtual desktop client 200 can analyze data received from the client data collector 210 and/or from the agent data collector 212 to determine actions to trigger based on a policy, which can be actions to be taken by either the client 200 itself, the agent 204, or both the client 200 and the agent 204. The virtual desktop client 200 can then convey corresponding instructions to trigger actions by either the client 200 itself (e.g., action to be implemented by the executor 230), the agent 204 (e.g., action to be implemented by the executor 232), or both the client 200 and the agent 204 (e.g., action to be implemented by each executor 230, 232).

Similarly, the virtual desktop agent 204 can analyze data received from the client data collector 210 and/or from the agent data collector 212 to determine actions to trigger based on policy, which can be actions to be taken by either the client 200, the agent 204 itself, or both the client 200 and the agent 204. The virtual desktop agent 204 can then convey corresponding instructions to trigger actions by either the client 200 (e.g., action to be implemented by the executor 230), the agent 204 itself (e.g., action to be implemented by the executor 232), or both the client 200 and the agent 204 (e.g., action to be implemented by each executor 230, 232).

In various embodiments, the intelligence module 220 can analyze data received from the client data collector 210, and/or from the agent data collector 212, and/or from the connection server 208 to determine actions to trigger based on policy, which can be actions to be taken by either the client 200, the agent 204, the connection server 208, or any combination of the three. The intelligence module 220 can then convey corresponding instructions to trigger actions by either the client 200 (e.g., action to be implemented by the executor 230), the agent 204 (e.g., action to be implemented by the executor 232), the connection server 208, or any combination of the three.

The intelligence module 220 can further consider global and/or historical telemetry data that can be obtained from other virtual desktops and client devices. For example, while the example of FIG. 2 illustrates the single client device 202 connected to the single virtual desktop 206, a real-world implementation would generally contain numerous (hundreds or thousands) of clients and virtual desktops, all of which may be linked to the intelligence module 220. The intelligence module 220 can determine actions to trigger on the client 200, agent 204, and/or connection server 208 based not only on telemetry data from these components, but also on telemetry data collected from any number of other clients and/or virtual desktops (which may be real-time data or historical data) by implementing certain algorithms or tools such as artificial intelligence or statistical analysis.

Each decision-making module (the intelligence module 220, client data analyzer 234, and agent data analyzer 236) can thus analyze the obtained telemetry data based on pre-defined policy, which may indicate what actions are to be triggered and, as applicable, by which component (e.g., by client 200, agent 204, or connection server 208) in the system when certain conditions are met. Consequently, a system such as the example system of FIG. 2, can enable management of virtual desktops in ways that were not available with previous technology.

Figure 3:
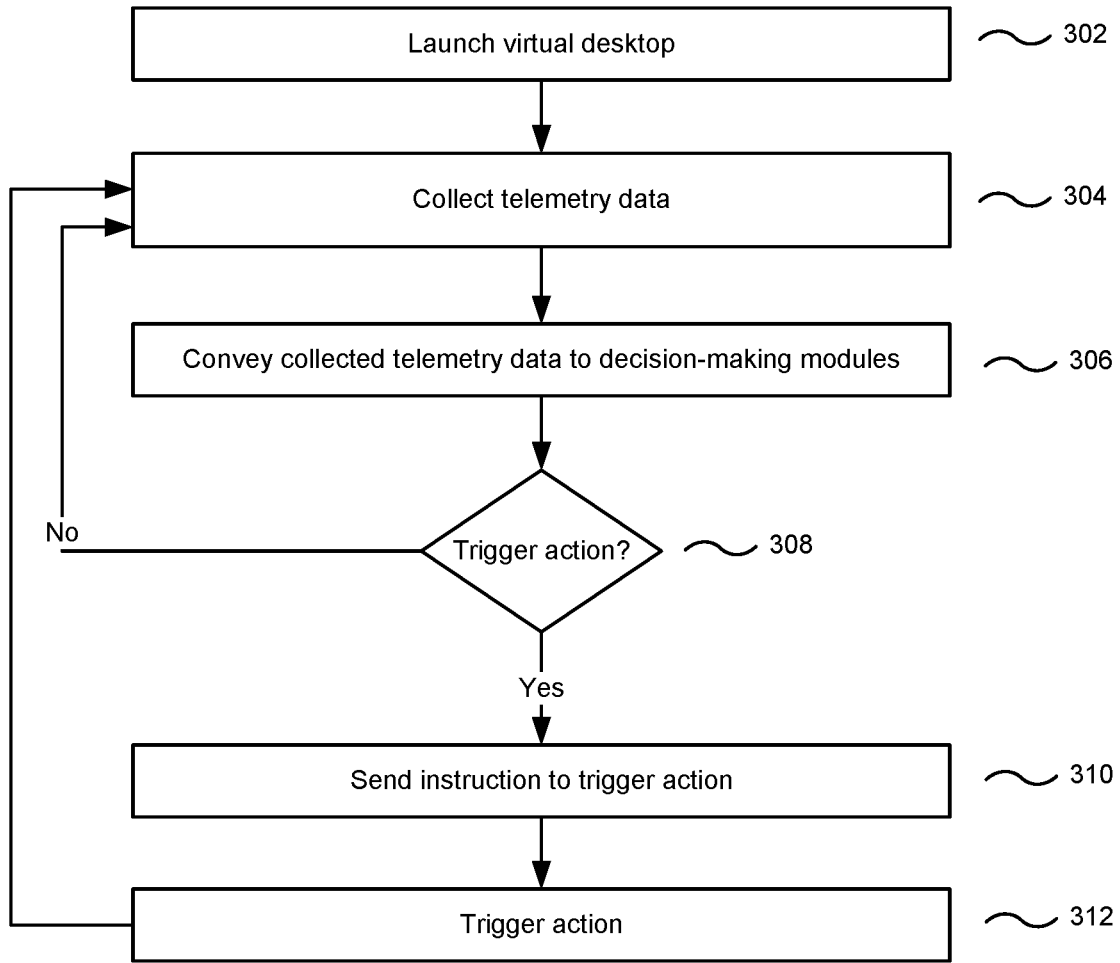
FIG. 3 illustrates an example process flow for dynamic and intelligent management of virtual desktops, in accordance with various embodiments.

FIG. 3 illustrates an example process flow for dynamic and intelligent management of virtual desktops, in accordance with various embodiments. The process can begin in operation 302, where a virtual desktop is launched. For example, a user can log into their virtual desktop using a virtual desktop client running on the user's client device and a connection server can establish a connection between the client and a virtual desktop agent running in the virtual desktop after the user is verified, to enable the virtual desktop session.

In operation 304, after the desktop session is launched, the process can proceed to collecting telemetry data. For example, telemetry data can be collected on the client device by a data collector running on the client device that monitors and logs various types of data as described above (app data, device data, performance data, etc.). Similarly, telemetry data can be collected on the virtual desktop by a data collector running on the virtual desktop that monitors and logs various types of data as described above (app data, device data, performance data, etc.). In some embodiments, telemetry data can also be collected on the connection server (e.g., by a data collector running on the connection server) that monitors and logs various types of data.

In operation 306, the collected telemetry data can be conveyed to decision-making modules such as to a data analyzer in the client device, a data analyzer in the virtual desktop agent, and/or to a server-based intelligence module. For example, the client data collector can convey the collected telemetry data to any or all these decision-making modules on a periodic basis, on a schedule, or as requested by the decision-making modules. Similarly, the virtual desktop data collector can convey the collected telemetry data to any or all these decision-making modules. Different data can be conveyed to the different decision-making modules as well. For example, the client data analyzer can register or subscribe to receive certain types or categories of data from the client data analyzer. Similarly, the agent data analyzer can register or subscribe to receive certain types or categories of data from the agent data analyzer.

In operation 308, a decision can be made whether to trigger action based on the received telemetry data at the decision-making modules. For example, either one of the three decision-making modules can determine, based on the received telemetry data, whether actions should be triggered on either the client or the agent. The decision modules can make the decision based on a policy that identifies what conditions should trigger what actions. In various embodiments, some decision-making modules such as the intelligence module can use data received from other clients and agents (e.g., in the same deployment), which may be real-time or historical data.

If, in operation 308, it is not determined that action should be triggered, then the process can return to operation 304, where it can continue to collect telemetry data. If, in operation 308, it is determined that certain action should be triggered, then the process can proceed to operation 310, where an instruction can be sent to trigger action. For example, after determining that certain action should be triggered, the decision-making module making the determination can send an instruction or request to the client and/or the agent to trigger the action (e.g., to an executor module in the client and/or agent). In various embodiments, the policy can specify where a prescribed action should be performed (e.g., on the client or the agent) and the decision module can send the instruction to the corresponding component.

In operation 312, the action can be triggered by the corresponding component receiving the instruction and the process can then return to operation 304, where it can continue to collect telemetry data. For example, the virtual desktop client can trigger an action on the client device (e.g., via an executor module) pursuant to a received instruction to trigger the action, and/or the virtual desktop agent can trigger an action on the virtual desktop (e.g., via an executor module) pursuant to a received instruction to trigger the action. As will be described in further detail below, the action can be to enable/disable a feature in the virtual desktop, adjust or configure a feature, restrict access to the virtual desktop, etc. As illustrated in this process flow, the virtual desktop can continuously be dynamically configured and adjusted to optimize performance and address various concerns such as security based on changing conditions.

In various embodiments, virtual desktop features that depend on network performance can be dynamically configured based on observed (e.g., by the client data collector) client device network connection parameters. For example, various virtual desktops utilize a clipboard redirection feature that allows a user to copy data in the local machine (in an app running on the client) and paste it into the virtual machine (in an app running in the virtual desktop) or vice versa in the other direction (copy data in the virtual machine and paste it in the client device). Generally, because in clipboard redirection the copied data travels over the network to perform a copy/paste operation, the size of the data allowed in the clipboard (i.e., the size of the clipboard) is limited to a fixed amount (e.g., 1 megabyte). However, the fixed clipboard size may be too large when the network is poor, resulting in poor performance. Conversely, the fixed clipboard size may be too small when networks is strong, producing unnecessary restrictions on the user.

In various embodiments, the clipboard size of the virtual desktop can be adjusted based on client device network connection parameters (e.g., based on bandwidth, throughput, etc.). For example, when the performance is poor (low bandwidth/throughput), the clipboard size can be reduced, and when the performance is good (high bandwidth/throughput), the clipboard size can be increased. A policy can be used to configure the size of the clipboard. For example, the policy can prescribe certain algorithms or thresholds for setting the size of the clipboard based on the network conditions (based on bandwidth, throughput, or based on network type (LAN, Wi-Fi), etc.). For example, if a network parameter (e.g., bandwidth or throughput) is lower than a preset threshold value, the clipboard size can be reduced to certain limit (e.g., 1 megabyte). In an embodiment, the policy can indicate a clipboard size for a specific network (e.g., an office network) so that the clipboard size is set to that size when the client device is on the specific network. The system can thus dynamically change the clipboard size based on the network. The policy can further take the network type into account, for example, if the client device is on a LAN connection, then the clipboard size can be set to a large value (e.g., 100 MB).

To implement this feature, for example, the client data collector can collect network parameters indicating network condition/performance on the client device, such as network type (LAN, WAN, etc.) speed, throughput, bandwidth, etc., and this information can be analyzed (e.g., by decision-making modules such as data analyzers in either the client, the agent, or the intelligence module) to determine a clipboard size based on some rules or policy. Then, an instruction can be sent to the agent (and/or to the client, as needed) to adjust the clipboard size per the policy.

In various embodiments, virtual desktop features that depend on client-side and agent-side computing resource parameters can be dynamically configured based on observed (e.g., by client or agent data collectors) computing resources (or availability thereof) at the client device and the virtual desktop. One example of such a feature is multimedia redirection (MMR). In various embodiments, MMR on a virtual desktop can be enabled/disable dynamically based on observed client-side and agent-side computing resources.

MMR is a feature used in virtual desktops to redirect multimedia streams from the virtual desktop to the client computing device to offload the demand from the host server and provide a better (e.g., smoother) multimedia user experience. With this feature, for example, when a user requests to play media in a media player on the virtual desktop, instead of rendering the video stream in the virtual desktop and conveying the GUI with the playing video to the virtual desktop client, the video stream can be intercepted before it is rendered in the virtual desktop and conveyed to the virtual desktop client. The virtual desktop client can then render the received video in a media player locally, providing better user experience and offloading the work of rendering the video from the server to the client device.

With current technology, the MMR feature is generally designed to be enabled or disabled by a global switch. This means that regardless of the configuration of the client device and the virtual desktop, all clients and agents follow the same configuration for redirecting multimedia streams. However, while MMR may be preferred when the user is on a powerful client device (e.g., a power office PC), it may not be preferable if the user is on a less powerful device such as a home thin client machine, which may be constrained in resources for performing tasks such as multimedia rendering.

To address such issues, in various embodiments the MMR feature in a virtual desktop can be enabled/disabled dynamically based on real-time computing resource parameters, such as GPU/CPU performance data on the client and/or the agent machine (the virtual desktop). For example, computing resource parameters (GPU/CPU performance data) can be collected on the client device and on the virtual desktop and compared. Then, based on a policy, a decision can be made by a decision-making module whether to disable MMR. In various embodiments, the policy can provide various rules for determining when MMR should be enable/disabled based on the computing resource parameters (e.g., real-time performance data such as GPU/CPU performance data) of the client device and/or the virtual desktop. For example, the policy can be structured to enable MMR when client-side performance is better and agent-side performance is worse and to disable MMR when client-side performance is worse and agent-side performance is better.

In various embodiments, the policy can indicate whether to disable MMR based only on the client-side computing resource parameters (e.g., when client GPU/CPU capacity is below a certain minimum threshold, MMR is turned off). In various embodiments, the policy can indicate whether to disable MMR based only on the agent-side computing resource parameters data (e.g., when client GPU/CPU capacity on the virtual desktop is below a certain minimum threshold, MMR is turned on).

In various embodiments, a data retriever on the virtual desktop client can subscribe to receive computing resource parameters (e.g., GPU performance events) from the client-side data collector. The virtual desktop client can convey this information (GPU performance events) to the virtual desktop agent (e.g., over a virtual channel). In the virtual desktop agent, local performance information (e.g., GPU performance data of the virtual desktop) can also be retrieved and compare with the client-side performance data received from the client to determine, based on a pre-defined policy whether to enable/disable the MMR feature dynamically.

In various embodiments, the system can be configured to initialize frame interpolation for optimizing the client display when certain conditions are present. For example, due to factors such as poor network conditions, the client display (e.g., the virtual desktop GUI that is presented in the virtual desktop client) can exhibit poor qualities such as low frames-per-second (FPS), manifesting itself in choppy or intermittent motion and poor user experience. In various embodiments, this can be detected on the client (e.g., either by detecting low FPS in the client or detecting a poor network). For example, a data collector on the client device can monitor the FPS in the client display and/or the network performance of the client device connection. This information can be conveyed to and used by a decision-making module to determine whether to trigger frame interpolation on the virtual desktop client.

For example, when it is detected that frames-per-second (FPS) of the client display is less than a threshold value and/or network performance parameters are below a threshold value, a decision-making module can check if the client device has sufficient computing resources for performing frame interpolation (e.g., sufficient CPU and/or GPU computing capability). The decision-making module can obtain this information from a data collector on the client device (which can cache this data), for example. If the decision-making module determines that, based on a predefined policy, the client device contains sufficient computing capacity for performing frame interpolation, then the decision-making module can trigger an action instructing the client to implement frame interpolation (e.g., to use the local computing capability to improve the remote display by inserting frames and making the remote display smoother). As a result, the FPS of the remote display presented in the client can be increased, thereby improving user experience.

Different techniques can be used for performing frame interpolation. For example, various existing AI-based motion estimation and compensation technologies can be implemented to perform frame interpolation, such as TOFlow (Video Enhancement with Task-Oriented Flow), DAIN (Depth-Aware Video Frame Interpolation), etc.

In various embodiments, the system can dynamically implement security features. For example, various security features can be enabled, disable, or adjusted in the virtual desktop based on a security assessment of the client device. Some features can be enabled, disable, or adjusted based on networks to which the client device is connected.

For example, generally, screen capturing/recording of the remote desktop GUI is not blocked on virtual desktops by default so that a user can record or take a screenshot of the screen using some screen capturing tools, as well as share their screen in a conference (which requires screen recording), etc. However, in some situations, such as when the user is on an unsecure network, it may be preferable to block screen capture for security reasons. In various embodiments, the system can be configured so that the network connection of the client device is monitored (e.g., a data collector on the client device can monitor all network interfaces and adapters) and if a client device is on a network that is deemed unsecure (e.g., as determined by a decision module such as a data analyzer or intelligence module, based on a policy), an instruction can be sent (e.g., by a decision module) to block screen capturing of the virtual desktop GUI (or of the client UI, which contains the desktop GUI). For example, an instruction can be sent to the virtual desktop client to block any attempt on the client device to screen capture or record the virtual desktop client (e.g., to capture/record the virtual desktop client UI). In an embodiment, an instruction can be sent to the virtual desktop agent to block any attempt to screen capture/record the virtual desktop GUI. Then, if an application attempts to capture the virtual desktop GUI, it will be blocked from doing so. This way, the screen capture features can be dynamically blocked or unblocked depending on the network that the user is on.

In various embodiments, whether a network is deemed secure can be determined based on a policy that can define, for example, which specific networks (e.g., office network) or types of networks are deemed secure (e.g., private networks) and/or which networks or types of networks (e.g., public networks, or home networks) are deemed unsecure.

In a similar way, other features can also be enabled or disabled based on whether the client device is on a network that is deemed secure or unsecure. For example, when the client is on an unsecure network (e.g., as detected by a data collector on the client device and determined by a decision-making module), anti-keylogger features can be activated, which are designed to stop keylogging attacks that attempt to capture user keyboard inputs on the client that may contain sensitive information (e.g., passwords). Such anti-keylogger features can work, for example, by obfuscating (or encrypting) keyboard inputs made on the client device so they can be de-obfuscated (decrypted) on the virtual desktop, thereby preventing keylogger software from capturing sensitive information.

Such anti-keylogger features can be activated and deactivated in a client and virtual desktop dynamically, based on the networks to which the client device is connected. For example, a decision-maker module can determine that a client device is on an unsecure network and send an instruction to the client and/or agent to enable the anti-keylogger feature.

In various embodiments, security features (such as the anti-keylogger feature or screen capture blocking feature) can also be enabled or disabled based on a more general security assessment of the client device itself, which can take into account various factors about the client device. Such factors can include the security software installed on the device (antivirus, anti-malware, etc.); the type of OS, its patches, and updates; the network the device is on (public, private, office network, etc.); the domain to which the device is joined; and so on. Such factors can be used to calculate a risk score for the device (based on some algorithms or rules) and based on the risk score the system can determine what features to enable or disable on the virtual desktop and the client.

In various embodiments, the system can determine whether to permit a user to log into a virtual desktop using a client device based on the client device's risk score. For example, the intelligence module can calculate (or maintain) a risk score for each client device and the user can be allowed or denied login based on this score (or the user can be given limited access). In various embodiments, each user can also have a risk score in the system (e.g., assigned based on various factors such as whether the user is registered, the user's job title, whether the user has access to certain sensitive data, user privileges, etc.) and the intelligence module can determine whether the user should be allowed or denied login based on the user's risk score as well as on the device risk score (or the user can be given limited access).

In various embodiments, the system can monitor and track hardware usage on client devices to give users warnings or suggestions when the usage exceeds certain predefined thresholds, as well as to diagnose and troubleshoot the system. For example, a data collector can track CPU usage on a client device and a warning message can be generated and presented (e.g., in the client or in the virtual desktop) when a usage threshold is exceeded. For example, the warning may indicate that the virtual desktop client may not run stably due to the CPU usage being too high on the client device, so that users can be aware of such issues. Similar warnings or suggestions can also be used for other hardware usage (such as GPU, RAM, Disk space, etc.) to make users aware of the potential risks. In some embodiments, when the system determines that some resource (CPU, GPU, RAM, etc.) is insufficient, it can deny login to a user (or log them out) or provide limited access.

In various embodiments, the system can track app usage on both the virtual desktop and the client device to optimize user experience with the apps. For example, data about a user's app usage (frequency, duration, etc.) on the client device can be collected (e.g., by a data collector on the client device) and data about the user's app usage (frequency, duration, etc.) on the virtual desktop can also be collected (e.g., by a data collector on the virtual desktop). Using the combined data about app usage on both the virtual desktop and the client device, user experience can be optimized for the user by, for example, sorting applications in the virtual desktop based on their usage (e.g., with the most used application being placed in the most convenient or prominent place such as at the top, so that the user can find that app easier).

For example, the data collectors on the client and virtual desktop can track when an app is opened and when it is closed, as well as when the app is active in the window. Based on this information, the system can determine the frequency and duration of use of the applications by the user in both the virtual desktop and on the client device.

Figure 4:
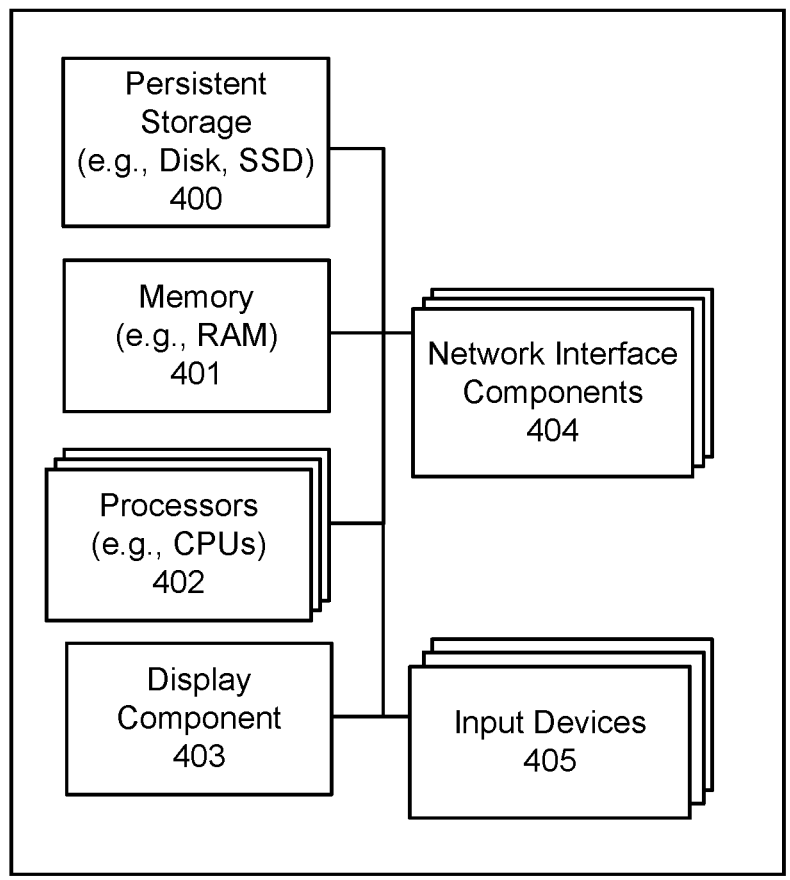
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi®, Bluetooth®, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for dynamic virtual desktop management, comprising:
    establishing a virtual desktop on a virtual desktop server and establishing a connection between a virtual desktop client running on a client device and a virtual desktop agent running in the virtual desktop server, the virtual desktop client being configured to receive inputs from a user on the client device and to convey the received user inputs to the virtual desktop agent to be effectuated in the virtual desktop, and wherein the virtual desktop client is further configured to present a graphical user interface (GUI) of the virtual desktop that is streamed to the virtual desktop client to the user on the client device;
    by a client data collector running on the client device, collecting client device telemetry data on the client device, the client device telemetry data comprising:
    client device network connection parameters;
    client device computing resource parameters;
    by a virtual desktop data collector running on the virtual desktop, collecting telemetry data on the virtual desktop, the virtual desktop telemetry data comprising:
    virtual desktop computing resource parameters; and
    by a decision-making module, configuring features on the virtual desktop based on the client device telemetry data and the virtual desktop telemetry data.

2. The method of claim 1, further comprising:
    based on the client device network connection parameters and a predefined policy, determining by the decision-making module that the client device is on an unsecure network; and
    in response to determining that the client device is on an unsecure network, blocking screen capture of the virtual desktop GUI.

3. The method of claim 1, further comprising:
    based on the client device network connection parameters and a predefined policy, determining by the decision-making module that the client device is on an unsecure network; and
    in response to determining that the client device is on an unsecure network, enabling an anti-keylogger in the virtual desktop.

4. The method of claim 1, further comprising:
    based on the client device computing resource parameters and a predefined policy, determining by the decision-making module that the client device has insufficient resources for multimedia redirection; and in response to determining that the client device has insufficient resources for multimedia redirection, disabling multimedia redirection in the virtual desktop.

5. The method of claim 1, further comprising:
based on the client device network connection parameters and a predefined policy, determining by the decision-making module a value for a size of a clipboard used for clipboard redirection in the virtual desktop; and
setting the size of the clipboard used in clipboard redirection on the virtual desktop to the determined value.

6. The method of claim 1, further comprising:
based on the client device network connection parameters and a predefined policy, determining by the decision-making module that the client device is on an unsecure network; and
in response to determining that the client device is on an unsecure network, denying a user login to the virtual desktop.

7. The method of claim 1, further comprising:
by the client data collector running on the client device, collecting user application usage information in the client device;
by the virtual desktop data collector running on the virtual desktop, collecting user application usage information in the virtual desktop; and
based on combined user application usage in the client device and in the virtual desktop, determining an order for organizing applications in the virtual desktop.

8. A computing device for dynamic virtual desktop management, comprising:
at least one processor; and
memory including instructions that, when executed by the at least one processor, cause the computing device to perform the steps of:
establishing a virtual desktop on a virtual desktop server and establishing a connection between a virtual desktop client running on a client device and a virtual desktop agent running in the virtual desktop server, the virtual desktop client being configured to receive inputs from a user on the client device and to convey the received user inputs to the virtual desktop agent to be effectuated in the virtual desktop, and wherein the virtual desktop client is further configured to present a graphical user interface (GUI) of the virtual desktop that is streamed to the virtual desktop client to the user on the client device;
by a client data collector running on the client device, collecting client device telemetry data on the client device, the client device telemetry data comprising:
client device network connection parameters;
client device computing resource parameters;
by a virtual desktop data collector running on the virtual desktop, collecting telemetry data on the virtual desktop, the virtual desktop telemetry data comprising:
virtual desktop computing resource parameters; and
by a decision-making module, configuring features on the virtual desktop based on the client device telemetry data and the virtual desktop telemetry data.

9. The computing device of claim 8, wherein the memory further includes instructions that when executed by the at least one processor, cause the computing device to perform the steps of:
based on the client device network connection parameters and a predefined policy, determining by the decision-making module that the client device is on an unsecure network; and
in response to determining that the client device is on an unsecure network, blocking screen capture of the virtual desktop GUI.

10. The computing device of claim 8, wherein the memory further includes instructions that when executed by the at least one processor, cause the computing device to perform the steps of:
based on the client device network connection parameters and a predefined policy, determining by the decision-making module that the client device is on an unsecure network; and
in response to determining that the client device is on an unsecure network, enabling an anti-keylogger in the virtual desktop.

11. The computing device of claim 8, wherein the memory further includes instructions that when executed by the at least one processor, cause the computing device to perform the steps of:
based on the client device computing resource parameters and a predefined policy, determining by the decision-making module that the client device has insufficient resources for multimedia redirection; and
in response to determining that the client device has insufficient resources for multimedia redirection, disabling multimedia redirection in the virtual desktop.

12. The computing device of claim 8, wherein the memory further includes instructions that when executed by the at least one processor, cause the computing device to perform the steps of:
based on the client device network connection parameters and a predefined policy, determining by the decision-making module a value for a size of a clipboard used for clipboard redirection in the virtual desktop; and
setting the size of the clipboard used in clipboard redirection on the virtual desktop to the determined value.

13. The computing device of claim 8, wherein the memory further includes instructions that when executed by the at least one processor, cause the computing device to perform the steps of:
based on the client device network connection parameters and a predefined policy, determining by the decision-making module that the client device is on an unsecure network; and
in response to determining that the client device is on an unsecure network, denying a user login to the virtual desktop.

14. The computing device of claim 8, wherein the memory further includes instructions that when executed by the at least one processor, cause the computing device to perform the steps of:
by the client data collector running on the client device, collecting user application usage information in the client device;
by the virtual desktop data collector running on the virtual desktop, collecting user application usage information in the virtual desktop; and
based on combined user application usage in the client device and in the virtual desktop, determining an order for organizing applications in the virtual desktop.

15. A non-transitory computer readable storage medium for dynamic virtual desktop management comprising one or more sequences of instructions, the instructions when executed by one or more processors causing the one or more processors to execute the operations of:
establishing a virtual desktop on a virtual desktop server and establishing a connection between a virtual desktop client running on a client device and a virtual desktop agent running in the virtual desktop server, the virtual desktop client being configured to receive inputs from a user on the client device and to convey the received user inputs to the virtual desktop agent to be effectuated in the virtual desktop, and wherein the virtual desktop client is further configured to present a graphical user interface (GUI) of the virtual desktop that is streamed to the virtual desktop client to the user on the client device;

by a client data collector running on the client device, collecting client device telemetry data on the client device, the client device telemetry data comprising:
client device network connection parameters;
client device computing resource parameters;

by a virtual desktop data collector running on the virtual desktop, collecting telemetry data on the virtual desktop, the virtual desktop telemetry data comprising:
virtual desktop computing resource parameters; and by a decision-making module, configuring features on the virtual desktop based on the client device telemetry data and the virtual desktop telemetry data.

16. The non-transitory computer readable storage medium of claim 15, further comprising instructions that when executed by the one or more processors cause the one or more processors to execute the operations of:
based on the client device network connection parameters and a predefined policy, determining by the decision-making module that the client device is on an unsecure network; and
in response to determining that the client device is on an unsecure network, blocking screen capture of the virtual desktop GUI.

17. The non-transitory computer readable storage medium of claim 15, further comprising instructions that when executed by the one or more processors cause the one or more processors to execute the operations of:
based on the client device network connection parameters and a predefined policy, determining by the decision-making module that the client device is on an unsecure network; and
in response to determining that the client device is on an unsecure network, enabling an anti-keylogger in the virtual desktop.

18. The non-transitory computer readable storage medium of claim 15, further comprising instructions that when executed by the one or more processors cause the one or more processors to execute the operations of:
based on the client device computing resource parameters and a predefined policy, determining by the decision-making module that the client device has insufficient resources for multimedia redirection; and
in response to determining that the client device has insufficient resources for multimedia redirection, disabling multimedia redirection in the virtual desktop.

19. The non-transitory computer readable storage medium of claim 15, further comprising instructions that when executed by the one or more processors cause the one or more processors to execute the operations of:
based on the client device network connection parameters and a predefined policy, determining by the decision-making module a value for a size of a clipboard used for clipboard redirection in the virtual desktop; and
setting the size of the clipboard used in clipboard redirection on the virtual desktop to the determined value.

20. The non-transitory computer readable storage medium of claim 15, further comprising instructions that when executed by the one or more processors cause the one or more processors to execute the operations of:
based on the client device network connection parameters and a predefined policy, determining by the decision-making module that the client device is on an unsecure network; and
in response to determining that the client device is on an unsecure network, denying a user login to the virtual desktop.

* * * * *